Aug. 25, 1925.
R. J. MEYERS
VEHICLE BRAKE
Filed Sept. 24, 1924
1,550,833
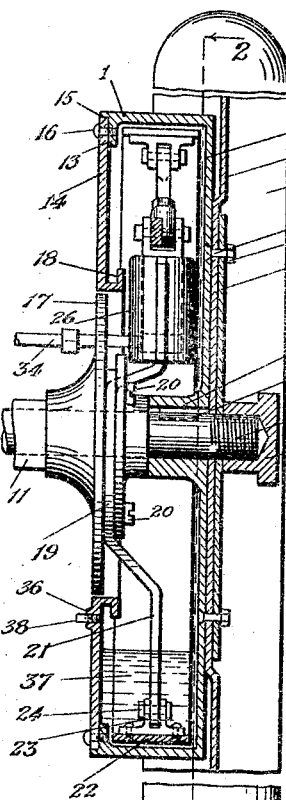
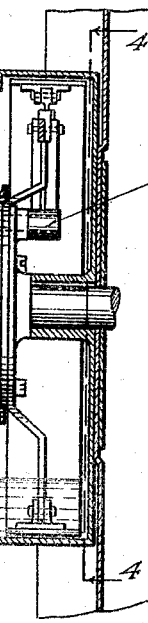
Fig. 1
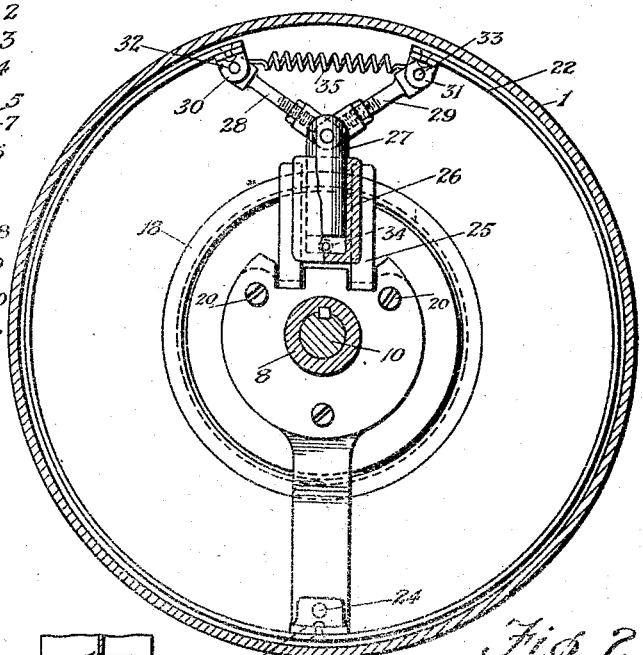
Fig. 2
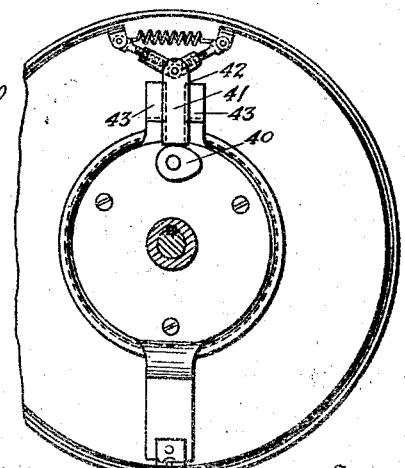
Fig. 3  Fig. 4
Inventor
ROY. J. MEYERS
By R. S. Berry
Attorney Patented Aug. 25, 1925.

1,550,833

UNITED STATES PATENT OFFICE.

ROY J. MEYERS, OF HOLLYWOOD, CALIFORNIA.

VEHICLE BRAKE.

Application filed September 24, 1924. Serial No. 739,494.

*To all whom it may concern:*

Be it known that I, ROY J. MEYERS, a citizen of the United States, residing at Hollywood, Calif., in the county of Los Angeles and State of California, have invented new and useful Improvements in Vehicle Brakes, of which the following is a specification.

My invention relates to vehicle brakes constructed primarily for use on automobiles.

The principal object of my invention is to provide a wheel brake construction embodying a brake drum in which the brake contacting surface of the brake drum runs in oil thereby preventing excessive heating of the parts and obviating the use of brake linings.

Another object of my invention is to provide an efficient brake construction enclosed in a casing adapted to be secured to the wheel of a vehicle.

A further object of my invention is to provide an efficient brake construction enclosed in a casing adapted to hold oil, and provided with means for preventing the escape of oil therefrom.

With the foregoing objects in view, together with such other objects and advantages as may subsequently appear, my invention resides in the parts and in the construction, combination and arrangement of parts, or their equivalents, hereafter described and claimed and illustrated by way of example in the accompanying drawings, in which:—

Figure 1 is a view partly in vertical section of a wheel embodying my improved brake construction used in conjunction with hydraulic operating means.

Figure 2 is a view of the brake construction taken on line 2—2 of Figure 1.

Figure 3 is a sectional view showing my invention used in conjunction with mechanical operating means; and Figure 4 is a view partly broken away taken on line 4—4 of Figure 3.

Referring now more specifically to the drawings particularly Figures 1 and 2.

A brake drum comprising a cylindrical brake engaging metal wall 1 formed integral with an inner disc-shaped wall 2 is secured to the inner side of the disc 3 of an automobile disc wheel 4 by means of bolts 5 passed through said inner drum wall and through the disc of said wheel, a strengthening plate 6 is disposed on the outer side of said wheel disc 3, and the said inner drum wall 2 wheel disc 3 and strengthening plate 6 are rigidly held together by means of nuts 7 threaded to said bolts 5.

The inner drum wall 2 is formed with a boss 8 disposed internally of the drum, which boss is keyed at 9 to an automobile axle 10 revoluble in the axle housing 11 by suitable means not shown. A nut 12 is threaded to the end of the axle 10 so as to hold the wheel thereon. The cylindrical brake-engaging metal wall 1 of the brake drum is provided with lugs 13 on the inner side thereof to which lugs are secured the outer casing plate 14 which fits snugly against an annular ledge 15 formed in the edge of the cylindrical brake wall 1 and is held in place thereto by means of bolts 16 passed through said casing plate 14 and threaded to said lugs 13.

The casing plate 14 is centrally cut away so as to permit said plate 14 to ride around the axle housing flange 17. An annular L-shaped flange 18 is formed around the edge of said casing plate 14 contiguous to said axle housing flange 17, and is disposed internally of the brake drum, the function of which flange is hereafter more fully explained.

A brake supporting bracket plate 19 disposed within the brake drum is centrally bored to seat over the axle 10 and is rigidly secured to the innerside of the axle housing flange 17 by means of bolts 20. Said bracket plate 19 is provided with a depending lug 21 which supports a substantially cylindrical open ended brake band 22, which brake band is provided with a bracket 23 disposed intermediate its length on the inner side thereof and to which bracket the lower end of said lug is secured by means of the bolt 24.

The upper edge of said bracket plate 19 is provided with an extension formed in the shape of a split tongue 25 adapted to rigidly support a cylinder 26 in which reciprocates a piston 27. To the upper end of the piston is pivoted a pair of similar shaped adjustable links 28 and 29, respectively, which links are connected one each to brackets 30 and 31 secured to the open ends of the brake band 22. The link 28 is pivoted by means of the bolt 32 to the bracket 30, and the link 29 is pivoted to the bracket 31 by means of the bolt 33. A pipe lead 34 leading from the hydraulic power source of supply (not shown) passes through the axle housing 17 and is connected to the lower end of the cylinder 26 below the piston 27. The outer casing plate 14 is provided with an opening 36 near the flange 18 to permit the oil 37 to be inserted into the brake drum. A stopper 38 normally closes said opening.

Fluid pressure exerted on the underside of the piston 27 causes it to rise in the cylinder 26 thereby forcing the links 28 and 29 apart incidently causing the outer edge of the brake band 22 to engage the inner surface of the cylindrical metal wall 1 to form the brake. A spiral spring 35 is secured to and between the brake end brackets 30 and 31 so as to disengage the brake band 22 from contact with the drum when the pressure is removed from the piston 27. In Figures 3 and 4 I have shown my device embodied in a brake construction using mechanical actuating means.

A brake rod 39 is provided with a cam 40 secured to the end thereof which cam reciprocates the piston 41 on the rotation of said brake rod 39. The piston 41 is provided with a pair of vertical grooves 42 in which fit the opposing inner edges of the split tongue 43 so as to hold said piston in place and to permit said piston to be vertically guided thereby.

Referring now to the operation of my invention:—

When the vehicle is running the centrifugal motion given to the oil 37 by the rotation of the brake drum causes the brake band 22 to be continually covered in oil and the peculiar construction and positioning of the flange 18 prevents the escape of oil from the brake drum.

Various modifications may be made in my construction without departing from the spirit of the invention and I do not wish to be limited to the exact device as shown, but claim as within the scope of my invention all forms readable on claims that will be finally allowed on this application.

Having described my invention, what I claim and desire to secure by Letters Patent of the United States of America is:—

1. In a brake construction adapted to be secured to a wheel and axle housing of a vehicle, the combination of a brake drum comprising a cylindrical brake band contacting wall, an inner disc-shaped wall and an outer wall, said outer wall centrally bored so as to revolve around and adjacent to the axle housing of said vehicle, means for securing said brake drum to one of the wheels of said vehicle, and a brake band operable within said brake drum, said brake band secured to the axle housing of said vehicle.

2. In a brake construction adapted to be secured to a wheel and axle housing of a vehicle, the combination of a brake drum comprising a cylindrical brake band contacting wall, an inner disc-shaped wall and an outer wall, said outer wall centrally bored so as to revolve around and adjacent to the axle housing of said vehicle, means for securing said brake drum to one of the wheels of said vehicle, a brake band operable within said brake drum, said brake band secured to the axle housing of said vehicle, means for inserting oil into said brake drum and an annular flange on the outer wall of said drum adjacent the axle housing of said vehicle for preventing the escape of oil from said brake drum.

ROY J. MEYERS.